May 10, 1955   R. M. MAGNUSON   2,707,982
OLIVE STEMMING APPARATUS
Filed April 22, 1950   4 Sheets-Sheet 1
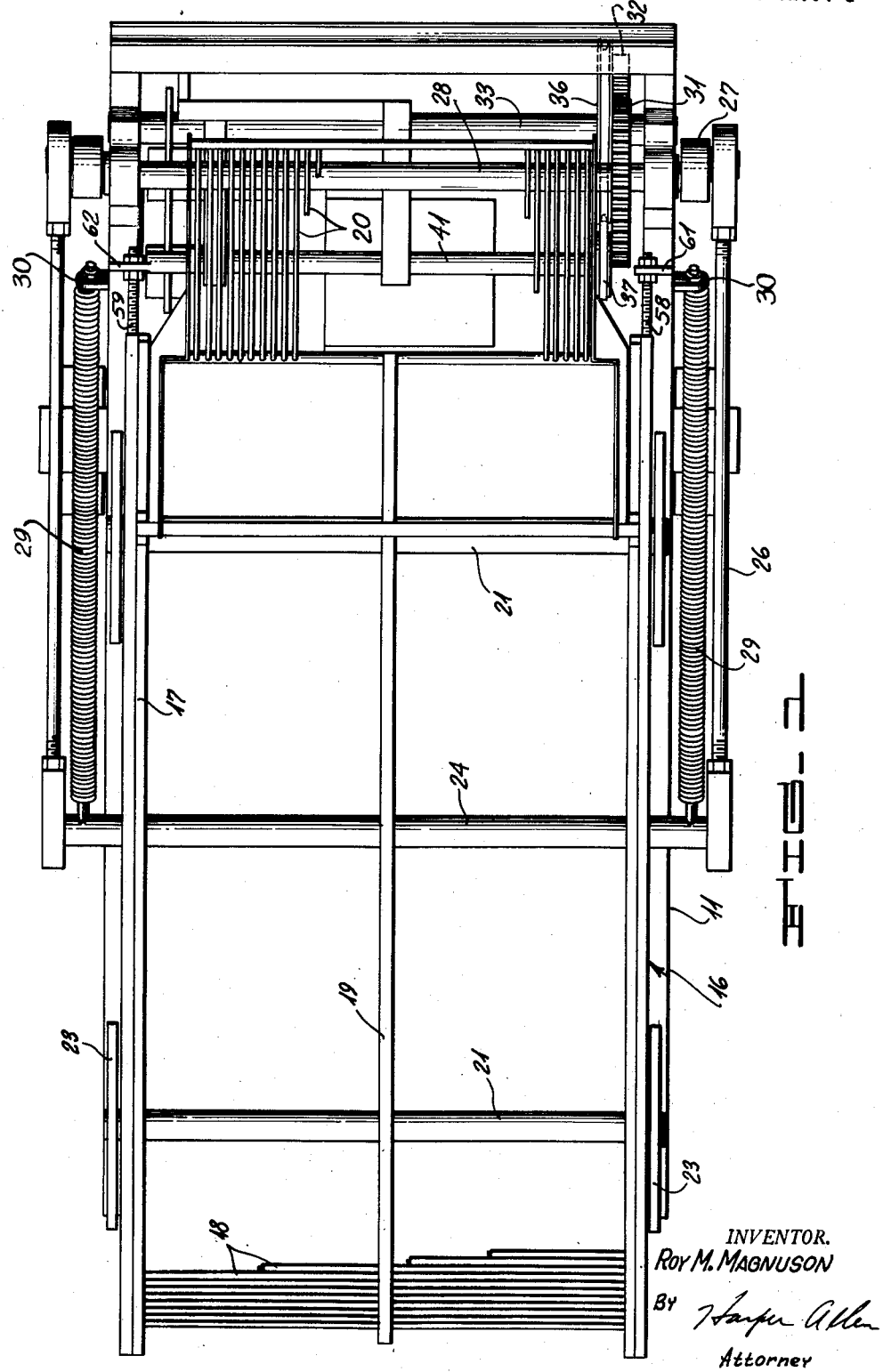
INVENTOR.
Roy M. Magnuson
By
Attorney

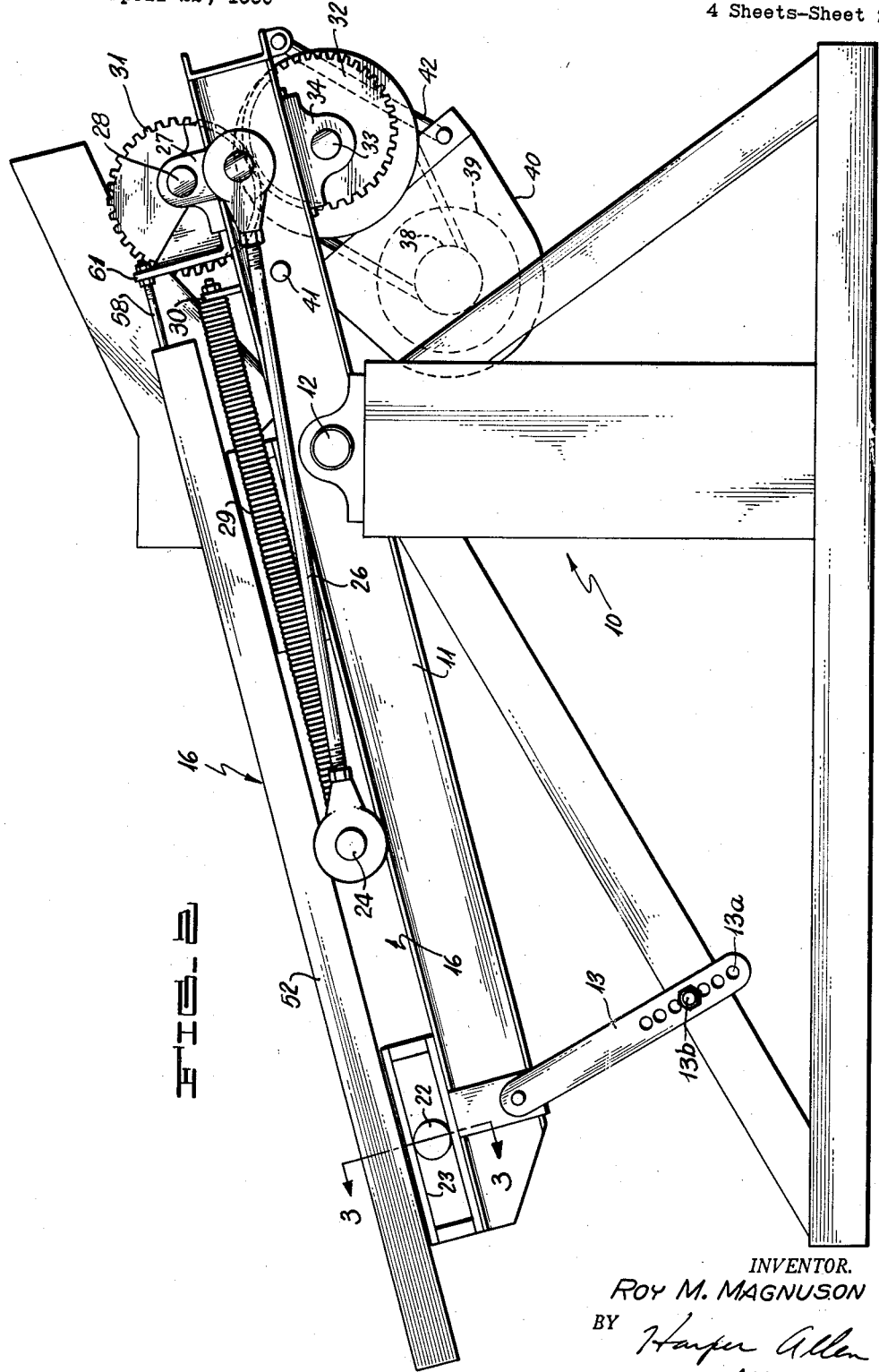

May 10, 1955
R. M. MAGNUSON
2,707,982
OLIVE STEMMING APPARATUS
Filed April 22, 1950
4 Sheets-Sheet 3
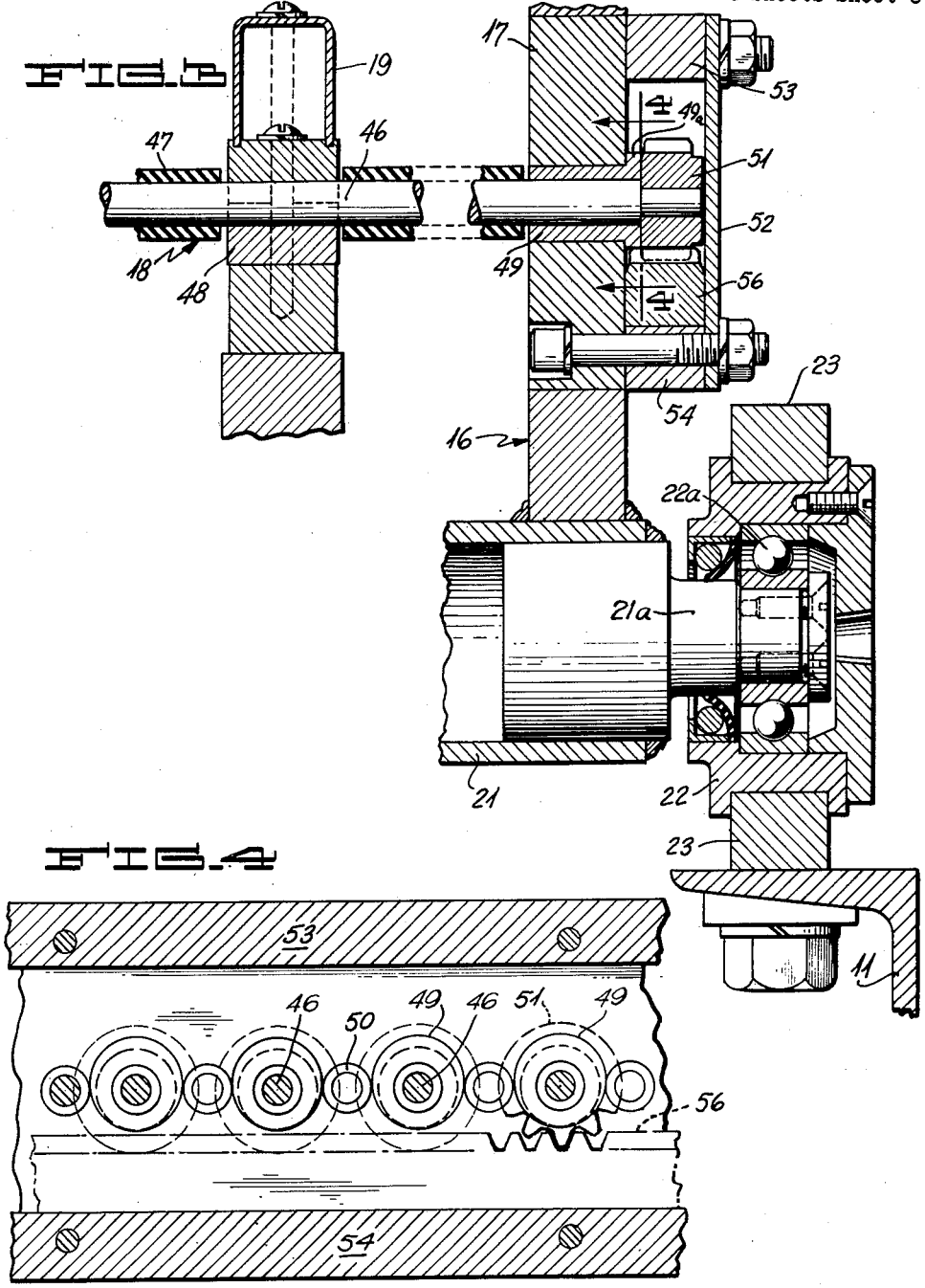
INVENTOR
ROY M. MAGNUSON
BY
Harper Allen
Attorney May 10, 1955   R. M. MAGNUSON   2,707,982
OLIVE STEMMING APPARATUS
Filed April 22, 1950   4 Sheets-Sheet 4

INVENTOR.
ROY M. MAGNUSON
BY Harper Allen
Attorney

United States Patent Office 2,707,982
Patented May 10, 1955

2,707,982

OLIVE STEMMING APPARATUS

Roy M. Magnuson, Campbell, Calif.

Application April 22, 1950, Serial No. 157,549

7 Claims. (Cl. 146—55)

The present invention relates to stemming apparatus and method for fruit and vegetable articles, such as olives or cherries, for example.

The stemming apparatus and methods are adaptable to different varieties of a given species, olives, for example, and different sizes of olives within a given variety, so that a maximum stemming efficiency and capacity balance may be obtained. The invention also provides for progression of the olives by movement of the stemming bed itself, and the movement of the stemming bed in cyclic fashion as relates not only to the progression of the olives but also to the stemming function and to the self-cleaning action of the stemming rolls.

The stemming apparatus is designed to provide good agitation of the olives to increase stemming efficiency, as well as to provide a self-clearing or non-clogging feature of the stemming rolls.

Further objects and advantages of the invention will be apparent from the following description of a preferred embodiment thereof, as illustrated in the accompanying drawings, in which:

Figure 1 is a plan view of an olive stemmer embodying the invention.

Figure 2 is a side elevational view of the olive stemmer.

Figure 3 is a fragmentary sectional view taken as indicated by the line 3—3 in Figure 2.

Figure 4 is an elevational view taken as indicated by the line 4—4 in Figure 3.

Figure 5:
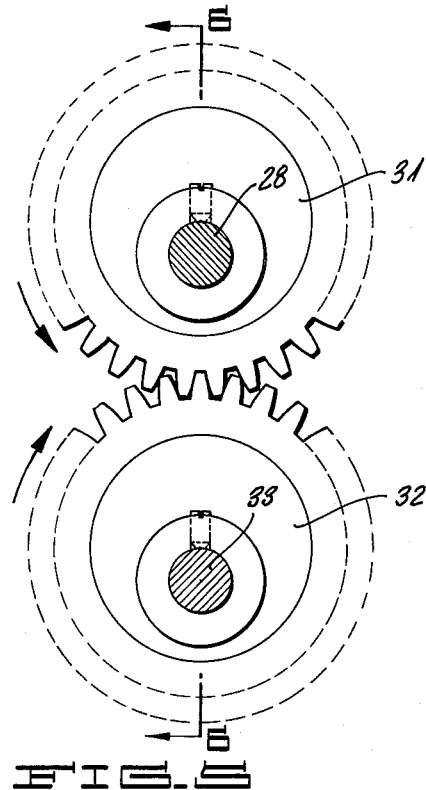
Figure 5 is a sectional elevation of the eccentric gearing.

Referring to Figures 1 and 2, the olive stemmer includes a base structure 10 of any suitable type on which a rectangular supporting frame 11 is pivotally mounted by suitable trunnions 12 adjacent one end and is carried on the support structure 10 at the other end by a pair of adjustably mounted links 13 by means of which the elevation of the left or discharge end of the frame 11 can be controlled with reference to the feed or right end (as shown in Figures 1 and 2). The adjustment is effected by holes 13a in each link 13 and a bolt 13b on the frame 10.

The olive stemmer includes a bed of stemming rolls including a frame structure 16 slidably mounted on the supporting frame side bars 17 in which a series of parallel rubber covered stemming rolls 18 are journalled. A center bearing strip 19 is provided for the rolls 18, as later described in detail. At its feed end the stemming bed has a suitable feed receiving grizzly 20 upon which the olives to be stemmed are dumped by any suitable feed means, such as a conveyor, for example. The frame structure 16 of the stemming bed is carried by four flanged rollers 22 (Figures 2 and 3) engaging in respective box tracks 23 on the supporting frame 11 to provide for back and forth movement with respect to, being shown in a central position as shown in Figures 1 and 2. As seen in Figure 3, each roller 22 is journalled on a conventional bearing 22a carried by a support member 21a at the end of an associated cross frame piece or pipe 21. The frame structure 16 also carries a transverse member in the form of a pipe 24 which is connected at its ends by respective connecting rods 26 with depending crank arms 27 carried at the respective ends of a transverse drive shaft 28 carried by the supporting frame 11. A pair of opposite springs 29 also extend between the transverse member 24 of the frame structure 16 and respective ears 30 on the supporting frame 11. These springs 29 are extended upon downward movement of the bed of stemming rolls, i. e., to the left in Figure 2, so as to assist in the upward movement and aid in maintaining an even load on the drive. The drive for the shaft 28 comprises a pair of eccentric or elliptical-type gears 31 and 32 and the lower gear 32 is carried on a shaft 33 suitably mounted in a bearing block 34 on the supporting frame 11. The shaft 33 also carries a suitable pulley 36 (Figure 1) which is driven through a belt 37 from a suitable drive pulley 38 (Figure 2) on the shaft of a suitable electric drive motor 39. The mount 40 for the motor 39 is carried on the supporting frame by a bolt 41 and by one or more links 42 so as to move with the supporting frame during its adjustment.

As previously pointed out, the bed of rolls is constructed for back and forth rotative or oscillating movement of each roll about its axis with adjacent rolls moving oppositely so that each valley between a pair of adjacent rolls is alternately stemming or non-stemming depending upon the direction of rotation of the rolls. As seen in Figure 3, each roll 18 includes a transverse shaft 46 having a pair of rubber coverings 47 thereon at either side of a center split support bushing 48 for the shaft 46. At one end each shaft 46 is supported in a flanged bushing 49 (Figures 3 and 4) having an eccentric flange 49a and carries a pinion 51 adjacent this flange. The other end of the shaft 46 is carried by a conventional bushing 50. One alternate series of rolls 18 have the gears 51 at one side of the machine and disposed within a housing provided by a cover plate 52 extending between top and bottom frame strips 53 and 54 which are secured to the side bar 17. Similarly, the other alternate series of rolls 46 are supported in eccentrically flanged bushings at the opposite side of the machine and carry gears 51 at such opposite side. Each bushing 50 which may be pressed in place is positioned between the flanged bushings 49 of the two adjacent shafts 46 so as to restrain rotation of these bushings. From the above description, it will be apparent that each alternate set of rolls 18 have their pinions 51 at one side of the machine while the other alternate set of rolls 18 have their pinions 51 at the opposite side of the machine.

Figure 7:
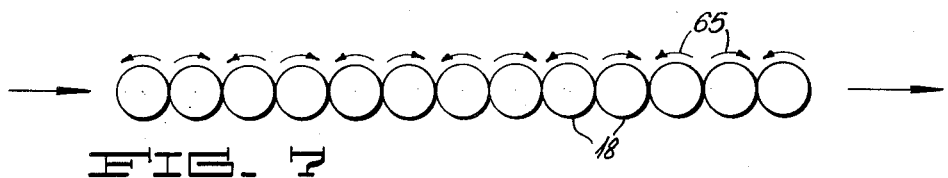
Figure 7 is a schematic view illustrating a direction of rotation of the series of rolls 18, in one direction of movement of the bed of rolls.
Figure 8:
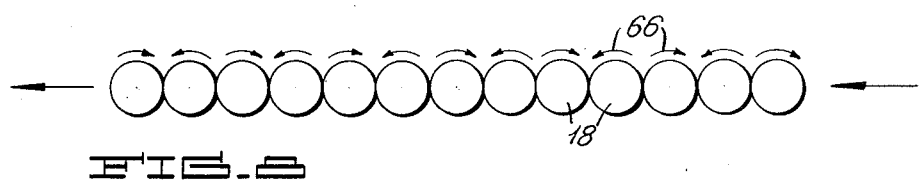
Figure 8 is a schematic view illustrating the direction of rotation of the rolls in the opposite direction of movement of the bed of rolls.

In order to produce opposite reverse rotation of adjacent stemming rolls 18, a rack 56 is mounted beneath the gears 51 adjacent the strip 54 on one side of the machine, and at the opposite side of the machine a similar rack 56 is mounted above the gears 51 in contact with the frame strip 53. The racks 56 are connected at their rearward ends to respective rods 58 and 59 to respective upstanding brackets 61 and 62 at the respective sides of the supporting frame 11. Thus as the roll bed 16 moves back and forth to either side of the central position thereof, the stationary racks 56 engage their respective sets of gears 51 so that adjacent rolls are rotated in opposite direction. Referring to Figure 7, for example, the direction of rotation of the series of rolls 18 is indicated for movement of the roll bed to the right as indicated by the arrows 65 in Figure 7. Figure 8 shows the direction of rotation of the same series of rolls when the roll bed is moved to the left, as indicated by the arrows 66 in Figure 8. Thus, each valley between a pair of adjacent rolls 18 is alternately stemming or non-stemming, once during each reciprocation of the roll bed each valley is a stemming valley and applies a stemming effect to any olives carried therein. Thus, irrespective of in which valley an olive may be positioned, if its stem is in a position to be engaged by a pair of rolls 18 it will be stripped from the olive. Also, by virtue of the alternate reverse rotations of each of the rolls 18, an effective agitating action of the olives is provided so that the length of the machine for a given capacity to insure substantially complete stemming can be reduced.

Figure 6:
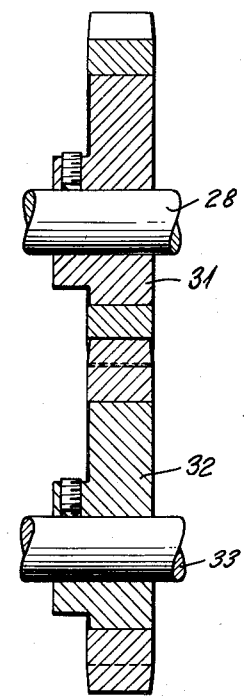
Figure 6 is a sectional view taken on the line 6—6 in Figure 5.

It will also be appreciated with respect to the relation of the eccentric or elliptical type gears 31 and 32, as seen in Figures 2, 5, and 6, that the roll bed is driven with an increasing forward or downward velocity and with a decreasing velocity during its return or upward stroke. In other words, the deceleration-stop-acceleration cycle is much shorter at the lower stroke reversal than at the upper stroke end. This effect operates to progress the olives forward even in a level position of the stemming bed. Figures 5 and 6 illustrate the positioning of the gears 31 and 32 at the end of the forward stroke of the roll bed.

In operation of the apparatus, the articles, such as olives, to be stemmed are fed, preferably in a continuous stream onto the grizzly 20 so that loose leaves, stems and other debris can fall through. The olives roll from the grizzly directly onto the bed of stemming rolls. By virtue of the back and forth movement of the bed of rolls, the olives are subjected to an intermittent progressing and agitating effect or movement, so that as they progress over the rolls, they are shifted about to arrive at a position in which the stem is presented to a stemming valley. Thus, the olives are progressed across the rolls from valley to valley along the bed and in this progression are moved bodily up and down as they move across each roll. Also, because of the intermittently reversed rotation of the rolls during such progression with adjacent rolls moving oppositely, each valley intermittently presents a stemming effect to any olives lying therein. It will be appreciated that the vertical adjustment of the discharge end of the bed enables its inclination to be varied in accordance with the size and type of olive to obtain the proper progression of olives over the roll bed so that the capacity of the machine will be utilized to its fullest extent and effective stemming operation performed.

While I have shown and described a preferred embodiment of the invention, it will be understood that the invention is capable of variation and modification from the form shown so that its scope should be limited only by the scope of the claims appended hereto.

I claim:

1. Apparatus for stemming articles, such as olives, comprising a bed of parallel adjacent stemming rolls, means mounting said bed for back and forth movement in a direction parallel to the desired path of movement of the articles, and means for effecting rotative movement of said rolls with adjacent rolls moving in opposite directions including respective sets of gears on opposite ends of alternate sets of said rolls, and respective racks connected to said mounting means and engaged with said respective sets of gears.

2. Apparatus for stemming articles, such as olives, comprising a bed of parallel adjacent stemming rolls, said rolls being disposed transversely of said bed, means mounting said bed for back and forth movement in a direction parallel to the desired path of movement of the articles and transversely of the length of said rolls, and means for effecting rotative movement of said rolls with adjacent rolls moving in opposite directions, said movement effecting means including means for intermittently reversing the direction of said rotative movement.

3. Apparatus for progressing articles, such as olives, comprising a bed of parallel adjacent stemming rolls, means mounting said bed for adjustment of the inclination thereof to vary the relative height of the feed and discharge ends of said bed, means mounting said bed for back and forth movement in a direction parallel to the path of movement of articles thereover, and means for effecting said back and forth movement including means for providing a faster deceleration-stop-acceleration cycle at the end of the forward stroke of said movement as compared with the end of the rearward stroke of said movement.

4. Apparatus for stemming articles, such as olives, comprising a bed of parallel adjacent stemming rolls, means mounting said bed for adjustment of the inclination thereof to vary the relative height of the feed and discharge ends of said bed, means mounting said bed for back and forth movement in a direction parallel to the path of movement of articles thereover, means for effecting said back and forth movement including eccentric gears for providing a faster deceleration-stop-acceleration cycle at the end of the forward stroke of said movement as compared with the end of the rearward stroke of said movement and means for rotating said rolls including means for effecting rotation of adjacent rolls in opposite directions.

5. Apparatus for stemming articles, such as olives, comprising a bed of parallel adjacent stemming rolls, means mounting said bed for adjustment of the inclination thereof to vary the relative height of the feed and discharge ends of said bed, means mounting said bed for back and forth movement in a direction parallel to the path of movement of articles thereover, means for effecting said back and forth movement including means for providing a faster deceleration-stop-acceleration cycle at the end of the forward stroke of said movement as compared with the end of the rearward stroke of said movement, and means for effecting back and forth rotative movement of the rolls of said bed.

6. Apparatus for stemming articles, such as olives, comprising a bed of parallel adjacent stemming rolls extending transversely of said bed, means mounting said bed for back and forth movement in a direction parallel to the desired path of movement of the articles and transverse to the length of said rolls, and means for effecting rotative movement of said rolls with adjacent rolls moving in opposite directions, said last named means including means for reversing the direction for said rotative movement upon each reversal of the back and forth movement of said bed.

7. Apparatus for stemming articles, such as olives, comprising a bed of parallel adjacent stemming rolls extending transversely of said bed, means for effecting back and forth movement of said bed in a direction parallel to the desired path of movement of the articles and transverse to the length of said rolls, and means for effecting rotative movement of said rolls with adjacent rolls moving in opposite directions, said last named means for reversing the direction for said rotative movement upon each reversal of the back and forth movement of said bed, said movement effecting means including means for providing a faster deceleration-stop-acceleration cycle at the end of the forward stroke of movement as compared with the end of the rearward stroke of said movement.

(References on following page)

References Cited in the file of this patent

UNITED STATES PATENTS

| | | |
|---|---|---|
| 616,933 | Kennelly | Jan. 3, 1899 |
| 883,708 | Fontana | Apr. 7, 1908 |
| 1,365,096 | Forry | Jan. 11, 1921 |
| 1,449,845 | Taylor | Mar. 27, 1923 |
| 2,048,470 | Sanborn | July 21, 1936 |
| 2,306,035 | Burdick | Dec. 22, 1942 |
| 2,446,646 | Forrest | Aug. 10, 1948 |
| 2,479,961 | Paul | Aug. 23, 1949 |
| 2,527,303 | Gaddie | Oct. 24, 1950 |

FOREIGN PATENTS

| | | |
|---|---|---|
| 580,841 | Germany | July 17, 1933 |